United States Patent [19]

Chang

[11] 4,139,669
[45] Feb. 13, 1979

[54] NON-KNIFING PLASTIC ADHESIVE TAPE FOR PACKAGING AND SEALING PURPOSE

[76] Inventor: Chow M. Chang, 261 Madison, Taipei, Taiwan, Taiwan, 10016

[21] Appl. No.: 849,816

[22] Filed: Nov. 9, 1977

Related U.S. Application Data

[63] Continuation of Ser. No. 504,168, Sep. 9, 1974, abandoned, which is a continuation of Ser. No. 368,218, Jun. 8, 1973, abandoned, which is a continuation-in-part of Ser. No. 175,059, Aug. 26, 1971, abandoned.

[51] Int. Cl.² ........................... B32B 3/28; B32B 3/30
[52] U.S. Cl. ................................. 428/167; 428/219; 428/220; 428/343
[58] Field of Search ............... 427/207; 428/167, 220, 428/219, 343

[56] References Cited

U.S. PATENT DOCUMENTS 3,115,417  12/1963  Christensen .................. 117/33.5

Primary Examiner—Bernard D. Pianalto
Attorney, Agent, or Firm—Ladas, Parry, Von Gehr, Goldsmith & Deschamps

[57] ABSTRACT

A hand tearable plastic adhesive tape having transverse striations on the front face thereof with the total thickness of the tape ranging from 0.05 to 0.3 mm, the depth of striations ranging from 0.015 to 0.125 mm, the width of the striations ranging from 0.06 to 0.5 mm, the pitch of striations ranging from 0.06 to 0.5 mm, the pitch of striations ranging from 0.1 to 8 mm with the cross-sectional shape of the striations being V or U like.

7 Claims, 7 Drawing Figures

A-A

B-B

NON-KNIFING PLASTIC ADHESIVE TAPE FOR PACKAGING AND SEALING PURPOSE

This is a continuation of application Ser. No. 504,168 filed Sept. 9, 1974, now abandoned, which is a continuation of application Ser. No. 368,218 filed June 8, 1973, now abandoned which is a continuation-in-part of Ser. No. 175,059 filed Aug. 26, 1971, now abandoned.

BACKGROUND OF THE INVENTION

This invention relates to a new type of plastic adhesive tape which can be easily and readily handtorn without using any cutting tool or dispenser to give a substantially straight, non-curling, and neatly torn edge.

Prior art adhesive tapes which are used mainly for such purposes as packaging or carton sealing, are made to have considerable tensile strength. For this reason, various types of plastic film, cloth, or Kraft paper which have considerable tensile strength have been used as base material for the tape. Thus, to cut off or remove a predetermined length of prior art tape from its roll, such as during packaging or sealing operation, it is necessary to use a cutting tool such as a knife, scissors, or tape dispenser. This necessity for an auxiliary tool makes packaging or sealing operation using prior art tapes inconvenient and inefficient.

Furthermore, most plastic polymer films of the prior art have longitudinally oriented molecular configuration. Hence hand-tearing of the conventional tapes in transverse direction is extremely difficult. Moreover when transverse tearing by hand is attempted, the tape instead of being torn clearly, tends to elongate and stretch unduly and produce an unsightly and generally unsealable edge.

SUMMARY OF THE INVENTION

An object of this invention is to provide a new type of plastic adhesive tape such as employed in packaging and sealing, which can be easily and readily hand-torn in a substantially transverse direction without using any cutting tool or dispenser to give a straight, non-curling and neatly torn edge, thus making packaging or sealing operation easier, faster, more convenient and efficient.

The foregoing and other objects are attained by the present invention which encompasses various types of thermoplastic or PVC film adhesive tapes. The tape comprises a thermoplastic film which forms a base. On the front face of the tape are suitably formed a plurality of striations or lines of recessed points running substantially transversely or somewhat diagonally and in parallel with each other by means of embossment calendering. The rear or back face of the tape is coated with a suitable adhesive layer by means of a conventional adhesive coater.

Advantageously, the inventive tape does not elongate to any substantial degree on applying a transverse tearing force thereto, such as by hand, but is readily torn off substantially in a transverse direction to give a straight, non-curling, and neatly torn edge. Furthermore the contact area between front face and rear face of the tape is minimized when it is rolled up, thus making unrolling operation easier and faster. Also the front face has a clothlike texture and appears soft and attractive.

DETAILED DESCRIPTION

Figure 2A:
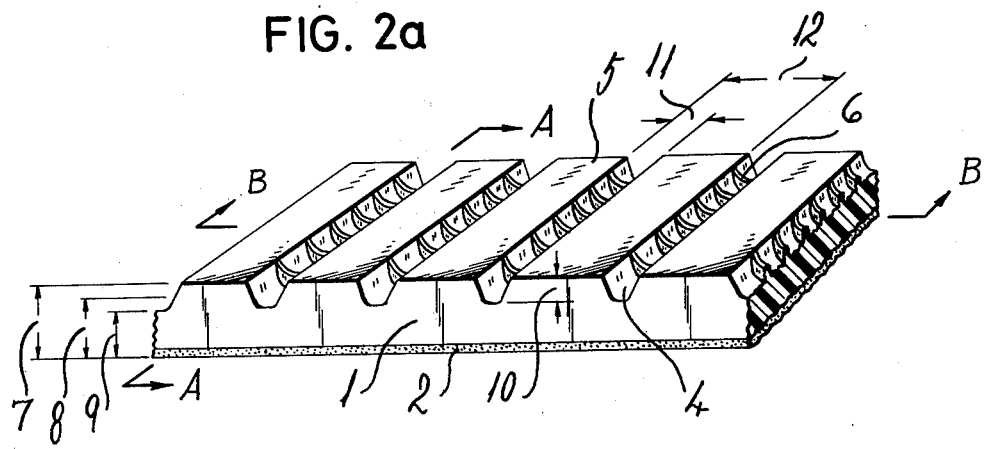
FIG. 2A depicts pictorially an embodiment showing lines of recessed points.
Figure 2B:
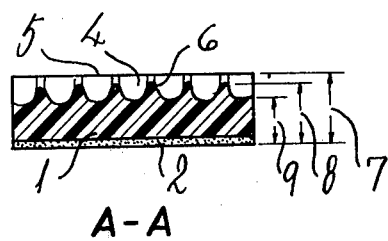
FIG. 2B depicts the longitudinal cross section taken along A—A of FIG. 2A.
Figure 2C:
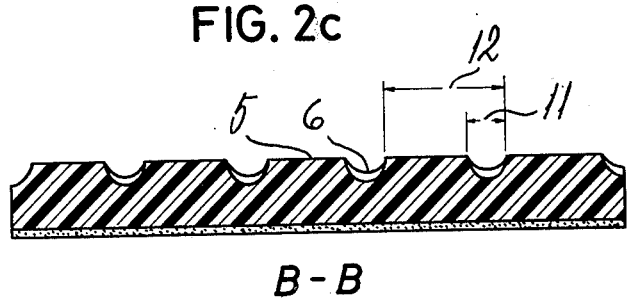
FIG. 2C depicts a diagonal cross section taken along B—B of FIG. 2A.

In each of the FIGS., the same numeral is used to denote similar parts. The embodiments depicted in the FIGS. comprise a film base 1, adhesive layer 2 on the flat back or rear surface of base 1, a top or front flat surface 5, a plurality of striations or line of recessed portions 3 extending substantially parallel to each other and substantially in a transverse direction as depicted. In FIGS. 2A, 2B, 2C, the striations show recessed portions 4 and raised portions 6 between the recessed portions.

As will be made clearer hereinbelow, the various dimensions of the tape are important and are as shown in FIGURES as follows: Total thickness of tape 7. Average thickness of tape 8. Thickness of base 9. Depth of striations or line of recessed portions 10. Width of striations or recessed portions 11. The pitch of striations or recessed portions 12.

Figure 1A:
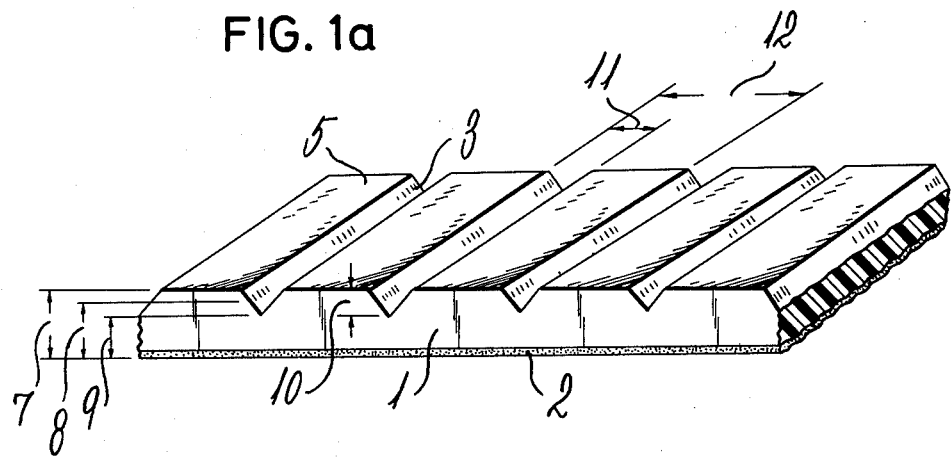
FIG. 1A depicts pictorially an illustrative embodiment of this invention.
Figure 1B:
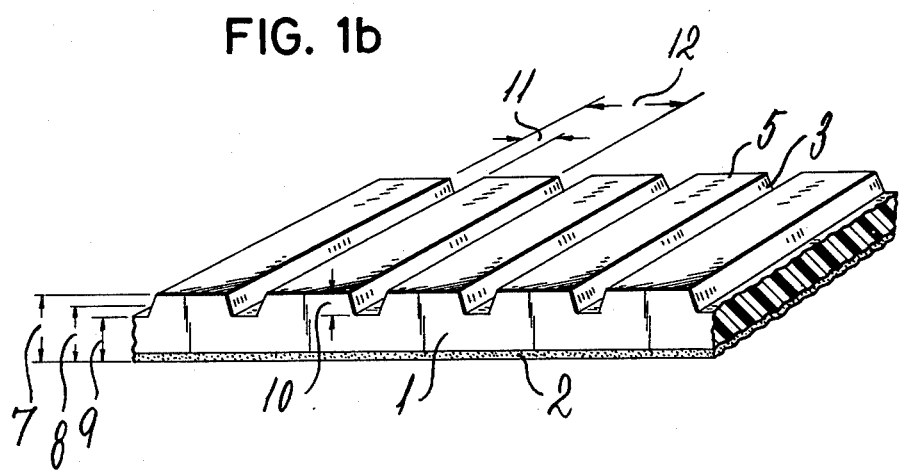
FIG. 1B depicts pictorially another illustrative embodiment of this invention.

Turning first to FIG. 1A, there is depicted striations having V-shaped longitudinal cross-sections. The embodiment of FIG. 1B shows striations having U-shaped longitudinal cross-sections. The embodiment of FIGS. 2A, 2B and 2C shows a plurality of substantially parallel lines formed by alternate recessed portions 4 and raised portions 6. FIG. 2B more specifically shows a longitudinal cross section of the embodiment of FIG. 2A taken along section line A—A. The indented or recessed portions 4 constitute the striations for purpose of measurement of depth, average thickness, width and pitch. The raised portion 6, are shown more clearly in FIG. 2C which is a diagonal cross-section taken along section line B—B. The raised portions 6 provide increased tensile strength.

Figure 3A:
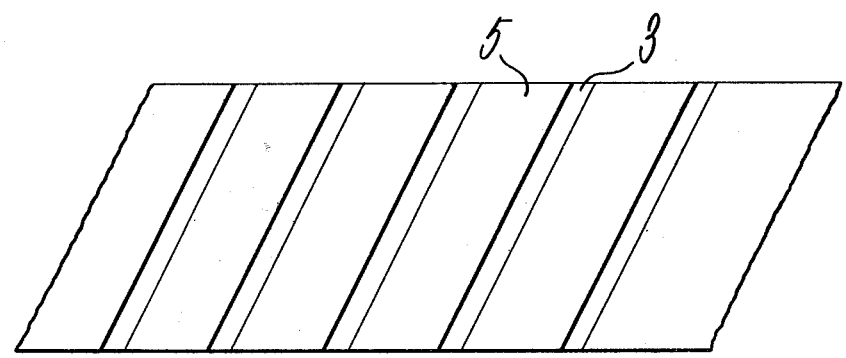
FIGS. 3A and 3B depict striations and lines disposed at a slight angle from the transverse direction.
Figure 3B:
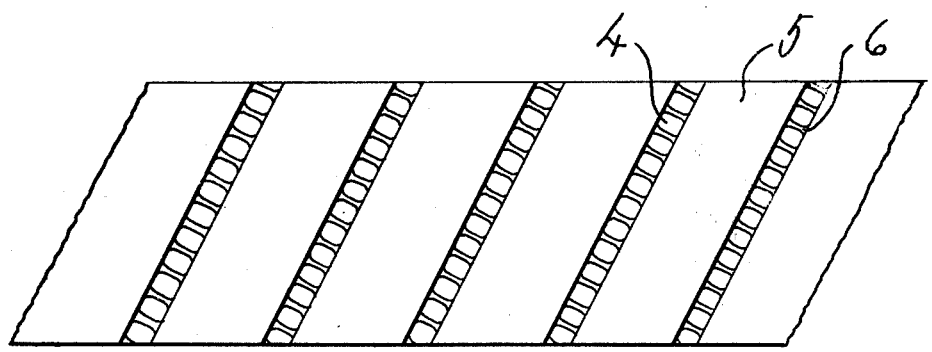

FIGS. 3A and 3B depict from a top view, embodiments similar to FIGS. 1A and 2A, respectively, but having a plurality of parallely disposed striations 3 and lines of recessed portions 4 and raised portions 6 running slightly at an angle from the transverse direction of the tape. The slight angle does not substantially affect the tearability of the tape. However, the tear will be along the striations or lines. Thus, angle of placement thereof should not be more than suitable.

The base (1) material can be any suitable material with polyethylene, polyesters, PVC, Polypropylene, etc. being preferred. The adhesive layer 2, can be of any commercially available adhesive of suitable strength and suitable other properties. The adhesive 2 can be coated on the back surface of base 1, which should be substantially smooth and flat, by any known apparatus. The striations or lines of recessed and raised portions can be suitably formed as to direction, depth, width and pitch by such means as embossment calendering.

There are various factors which I have discovered to affect the hand tearability of plastic adhesive tape. These variable factors include the following dimensions of striations or recessed portions, depth (10), width (11), pitch (12), and cross-sectional shape of striations and lines of recessed points. Also the average film thickness (8) and type of material used to make the film base is significant.

The thickness of commercially available thermoplastic films ranges from 0.025 to 0.5 mm. Extremely thin films are difficult to make and may not have sufficient tensile strength required for packaging and sealing applications. Moreover, extremely thick films are practically uneconomical for the same application and hence are unnecessary.

The variable factors relevant to striations must be selected to give easy hand-tearability and yet give sufficient tensile strength required for packaging and sealing applications. Extremely shallow striations are difficult to make, while extremely wide striations may not give desirable ready and crispy hand-tearability. When striations are too deep, they may not give the minimum tensile strength required of packaging tapes. In addition the striations may be suitably spaced so that the striated tape may be torn at any point to a desired length.

The film material and plasticizer used therewith should be carefully selected so that the film made from such materials has the desired physical properties of hand-tearable adhesive tape.

The invention is further illustrated with actual examples, which examples are not to be construed to limit this invention.

Various samples of the inventive adhesive tape having different film thickness and different striations and prior art tapes were prepared and tested for tensile strength, elongation, and tear strength. The dimensional measurements of the tested samples and the results obtained thereby are shown in Table 1 and Table 2. The film base material used to prepare the test samples was a commercially available PVC (poly vinyl chloride) thermoplastic resin containing approximately 25 PHR (parts per hundred parts of resin) plasticizer such as DOP (dioctyl phthalate).

The following conclusions could be drawn from the results of these tests:

(1) For an equal average tape thickness (8) (see FIGS. 1A, 1B, 2A, 2B for illustration of dimensions), the tensile strength of the striated adhesive tape is generally smaller than that of the flat faced tape regardless of test orientation either longitudinal or transverse. Particularly the longitudinal tensile strength of striated tape drops far more below that of the flat faced tape than the transverse tensile strength of the striated tape drops below that of the flat faced tape. In general the total thickness of a flat face tape would be its average thickness.

For different average thickness, as the percentage depth of striations (10) to the total thickness (7) becomes greater, then the tensile strength drops relatively more. In fact, when the percentage depth of striations is 50% of the total thickness (7), the longitudinal tensile strength drops to approximately 75% of that of the flat faced tape having the same thickness as the average thickness (8) of the striated tape. Thus, exceeding the ratio of depth of striation to total thickness beyond the 50%, is thus considered uneconomical. Too much tensile strength is sacrificed by providing the striations over the flat face type tape.

(2) In general, the elongation of the inventive tape is smaller than that of flat faced tape which has the same thickness as the average thickness (8) of the striated tape. The longitudinal elongation of the inventive tape is substantially smaller than that of flat faced tape having the same thickness as the average thickness (8) of the former. The transverse elongation of the inventive tape differs so little from that of the flat faced tape. I have discovered that the longitudinal elongation tends to become smaller as the ratio of depth of striations (10) to the total thickness (7) becomes greater. From analysis of this tendency, I concluded that it would be possible to make a striated plastic adhesive tape readily and easily tearable by selecting suitable size, depth and pitch of striations for selected thickness of the tape with such selection to be made so as not to sacrifice desired tensile strength.

When the ratio of depth of striation (10) to total thickness (7) is about 18%, the longitudinal elongation of the striated tape drops to approximately 90% that of the flat faced tape of the same average thickness (8). Thus any ratio of depth of striation to total thickness less than this limit can be considered insignificant.

(3) The longitudinal tear strength of the inventive tape is almost equal to or just slightly lower than that of flat faced tape having total thickness the same as the average thickness (8) of the inventive tape. But, I discovered that surprisingly, the transverse tear strength tends to drop far more below that of flat faced tape having total thickness the same as average thickness (8) of the inventive tape; the transverse tear strength of the inventive tape ranges approximately between 10 to 30% of that of the prior flat faced tape. In fact, the transverse tear strength of the inventive striated prior tape drops even far more below that of the flat faced tape having a total thickness equal to the base thickness (9) of the inventive striated tape. It seems that mechanical weakness, especially against tearing force, is created in the striated tape by providing such striations over the flat faced tape. As the ratio of depth of striation to total thickness increases, the tearing strength tends to become smaller.

In general, the highest limit of tear strength below which we can hand-tear this type of tape is around 200 to 250 gram force. This means that for an adhesive tape of 0.19 mm thickness, the ratio (or when multiplied by 100 percentage) of depth of striations to total thickness should be 23% or slightly more.

From the foregoing analytical considerations based on my actual sample tests, I concluded that the following dimensional requirements were preferred to produce a striated thermoplastic adhesive tape which can be easily and readily hand-tearable transversely and which would have sufficient tensile strength to be used, economically for such applications as packaging and sealing. The total thickness (7) of the tape should preferably be in the range of 0.05 to 0.3 mm and more preferably in the range of 0.06 to 0.25 mm. The depth (10) of striations or recessed portions (in FIG. 2A) should preferably be in the range of 0.015 to 0.125 mm and more preferably in the range of 0.02 to 0.12 mm depending on the total thickness (7) and the type of material of the film base used. The width (11) of striations or lines of recessed portion should preferably be in the range of 0.06 to 0.5 mm and more preferably in the range of 0.08 to 0.4 mm also depending on the total thickness (7) and the type of material of the film base used. The pitch (12) of striations or lines of recessed portions should preferably be in the range of 0.1 to 8 mm and more preferably in the range of 0.15 to 5 mm. The longitudinal cross-sectional pattern of the striation may be V-shape (FIG. 1A) or U-shape (FIG. 1B). The V-shape is preferable. The film base material may be of such materials as poly vinyl chloride, polyethylene, polyesters of all types, including such brand names as Texron and Mylar, or any other suitable thermoplastic materials which can be formed into films. In connection with the foregoing, the measurement of the dimensions can be best seen in the various figures of the drawing.

The foregoing description is intended to illustrate the principles of the invention. Numerous other variations and modifications thereof would be apparent to the worker skilled in the art. All such variations and modifications are to be considered to be within the spirit and scope of the invention.

disposed substantially parallel to each other and substantially transverse to the length of the tape, with the depth of the striations being from 18% to 50% of the thickness of the plastic film, the tape having an uninterrupted depth of the material of the plastic film adjacent the adhesive coated surface.

2. An adhesive plastic tape according to claim 1 wherein the striations have a width of 0.06 to 0.5 mm.

3. An adhesive plastic tape according to claim 2 wherein the pitch of the striations is 0.1 to 8 mm.

4. An adhesive plastic tape according to claim 3 wherein the tape has a thickness of 0.05 to 0.3 mm and Table 1

| Measurement and Test | Type of Surface | F/S | F/S | F/S | F/S | F/S | F/S | F/S | F/S | F/S |
|---|---|---|---|---|---|---|---|---|---|---|
| Avg. Thickness mm | | .08 | .10 | .12 | .13 | .14 | .16 | .19 | .22 | .25 |
| Total Thickness mm | | .08/.105 | .10/.125 | .12/.145 | .13/.155 | .14/.165 | .16/.185 | .19/.215 | .22/.245 | .25/.275 |
| Depth of Striation, mm | | 0/.05 | 0/.05 | 0/.05 | 0/.05 | 0/.05 | 0/.05 | 0/.05 | 0/.05 | 0/.05 |
| % of T. Th. | | 0/47.6 | 0/40 | 0/34.5 | 0/32.3 | 0/30.3 | 0/27.0 | 0/23.3 | 0/20.4 | 0/18.2 |
| Number of Striations/10mm | | 0/17.5 | 0/17.5 | 0/17.5 | 0/17.5 | 0/17.5 | 0/17.5 | 0/17.5 | 0/17.5 | 0/17.5 |
| Pitch, mm | | ∞/.571 | ∞/.571 | ∞/.571 | ∞/.571 | ∞/.571 | ∞/.571 | ∞/.571 | ∞/.571 | ∞/.571 |
| Tensile Strength kgf/10 mm; Width | | 2.37/2.1 | 2.0/2.5 | 3.2/2.6 | 3.77/3.1 | 4.15/3.6 | 4.98/4.61 | 5.61/5.44 | 6.6/6.2 | |
| Longitudinal Transverse | | 1.5/1.0 | 1.7/1.6 | 2.2/2.0 | 2.6/2.3 | 2.9/2.58 | 3.2/2.95 | 3.77/3.55 | 4.3/4.2 | 4.7/4.6 |
| Elongation, %: Longitudinal | | 150/120 | 172/140 | 186/145 | 200/150 | 202/158 | 205/152 | 223/171 | 205/188 | 215/190 |
| Transverse | | 130/110 | 170/163 | 178/155 | 182/180 | 183/170 | 195/180 | 192/186 | 196/182 | 20/89 |
| Tear Strength,g: Longitudinal | | 37/35 | 100/90 | 120/90 | 140/106 | 145/100 | 160/150 | 242/213 | 286/303 | 420/350 |
| Transverse | | 240/60 | 373/66 | 750/80 | 950/140 | 1050/190 | 1480/219 | 1820/236 | 2210/390 | 2500/560 |

F-Flat faced, S-Striated (Width of Striation .15mm)
Test Condition.23° C & 60% R. H.
Test Methods
Tensile Strength JIS K6732-1958
Elongation JIS K6732-1958
Tear Strength JIS K6732-1967

Table 2

| Measurement and Test | Type of Surface | F | S | S | S | S | S |
|---|---|---|---|---|---|---|---|
| Avg. Thickness, mm | | .16 | .16 | .16 | .16 | .16 | .16 |
| Thickness,mm Total/Base | | .16/.16 | .165/.155 | .175/.135 | .185/.135 | .195/.125 | .205/.115 |
| Depth of Striation, mm | | 0 | .01 | .03 | .05 | .07 | .09 |
| % of T. Th. | | 0 | 6.1 | 17.1 | 27.0 | 35.9 | 43.9 |
| Number of Striations/10mm | | 0 | 17.5 | 17.5 | 17.5 | 17.5 | 175.5 |
| Pitch,mm | | ∞ | .571 | .571 | .571 | .571 | .571 |
| Tensile Strength, Kgf/10mm; Longitudinal | | 4.15 | 4.04 | 3.85 | 3.6 | 3.35 | 3.2 |
| Transverse | | 3.2 | 3.2 | 3.1 | 2.95 | 2.8 | 2.7 |
| Elongation,%: Longitudinal | | 205 | 196 | 177 | 152 | 147 | 113 |
| Transverse | | 195 | 189 | 186 | 180 | 176 | 171 |
| Tear Strength,g: Longitudinal | | 160 | 158 | 153 | 150 | 145 | 138 |
| Transverse | | 1.480 | 650 | 320 | 219 | 204 | 185 |

F-Flat faced, S-Striated (Width of Striation .15mm)
Test Condition-23° C & 60% R. H.
Test Methods-
Tensile Strength JIS K6732-1958
Elongation JIS K6732-1958
Tear Strength JIS K6732-1967

What is claimed is:

1. An adhesive plastic tape for sealing and packaging purposes, comprising a flexible thermoplastic elongate plastic film having a front surface, a rear surface and two substantially straight and interrupted edges, an adhesive coated on the rear surface, the adhesive coated rear surface being substantially uninterrupted and planar and the front surface being an embossed surface defining a plurality of striations, the striations being the striations have a depth of 0.015 to 0.125 mm.

5. An adhesive plastic tape according to claim 4 wherein said tape thickness ranges from 0.06 to 0.25 mm; the depth of striations ranges from 0.02 to 0.12 mm; the width of striations ranges from 0.08 to 0.40 mm; and the pitch of striations ranges from 0.15 to 5 mm.

6. An adhesive plastic tape according to claim 1 wherein the thermoplastic is a material selected from the group consisting of polyethylene, polyvinyl chloride, polyesters and polypropylene.

7. An adhesive plastic tape for sealing and packaging purposes, comprising a flexible, soft plastic film of a material selected from the group consisting of polyethylene, polyvinyl chloride, polyesters and polypropylene, having a front side surface and a rear side surface and two substantially straight and uninterrupted edges, an adhesive coated on said rear surface, said rear surface being substantially uninterrupted and substantially flat throughout the said rear surface; and said front surface being an embossed surface defining a plurality of striations disposed substantially parallel to each other and substantially transverse to the length of said tape, said tape being readily torn by hand in the transverse direction to give a substantially straight, non-curling and neatly torn edge, said tape having the following dimensions: total thickness, 0.05 to 0.3 mm; depth of striation or recessed portion, 0.015 to 0.125 mm; width of striation or lines, 0.06 to 0.5 mm; and pitch of striations or lines, 0.1 to 8 mm; and wherein the percentage of depth of striation to total thickness ranges from 18% to 50% with said tape having an uninterrupted depth of said material throughout the tape closest to said rear side surface whereby tensile strength in the length direction is at all locations sufficient for sealing and packaging purposes.

* * * * *

UNITED STATES PATENT AND TRADEMARK OFFICE
CERTIFICATE OF CORRECTION

PATENT NO. : 4,139,669
DATED : February 13, 1979
INVENTOR(S) : CHANG, Chow M.

It is certified that error appears in the above-identified patent and that said Letters Patent are hereby corrected as shown below:

In the claims, claim 1 line 4, "interrupted" should be "uninterrupted".

Signed and Sealed this

Eighth Day of April 1980

[SEAL]

Attest:

SIDNEY A. DIAMOND

Attesting Officer

Commissioner of Patents and Trademarks